United States Patent [19]

Bark

[11] Patent Number: 4,819,084

[45] Date of Patent: Apr. 4, 1989

[54] METHOD FOR PRINTING THE FRAME OF A COLOR TELEVISION BY USING THE LIQUID CRYSTAL FILTER

[75] Inventor: Kwan Bark, Seoul, Rep. of Korea

[73] Assignee: Samsung Electronics Co., Ltd., Suwon, Rep. of Korea

[21] Appl. No.: 142,505

[22] Filed: Jan. 11, 1988

[51] Int. Cl.⁴ .............................................. H04N 1/21
[52] U.S. Cl. ..................................... 358/296; 358/293
[58] Field of Search ............... 358/296, 300, 302, 293; 350/332; 346/160, 107, 108

[56] References Cited

U.S. PATENT DOCUMENTS 4,003,081  1/1977  Hilsum et al. ......................... 358/64
4,605,972  8/1986  Hatanaka ............................. 358/296

Primary Examiner—E. A. Goldberg
Assistant Examiner—Lincoln Donovan

[57] ABSTRACT

There is disclosed a method for printing the frame of a color television by using the liquid crystal color filter. The liquid crystal color filter serves to form the frame of complementary colors. Projecting the light beams of a light source on said frame of complementary colors of said liquid crystal color filter makes the original colors reappear, thereby the frame being printed on a printout paper.

1 Claim, 2 Drawing Sheets

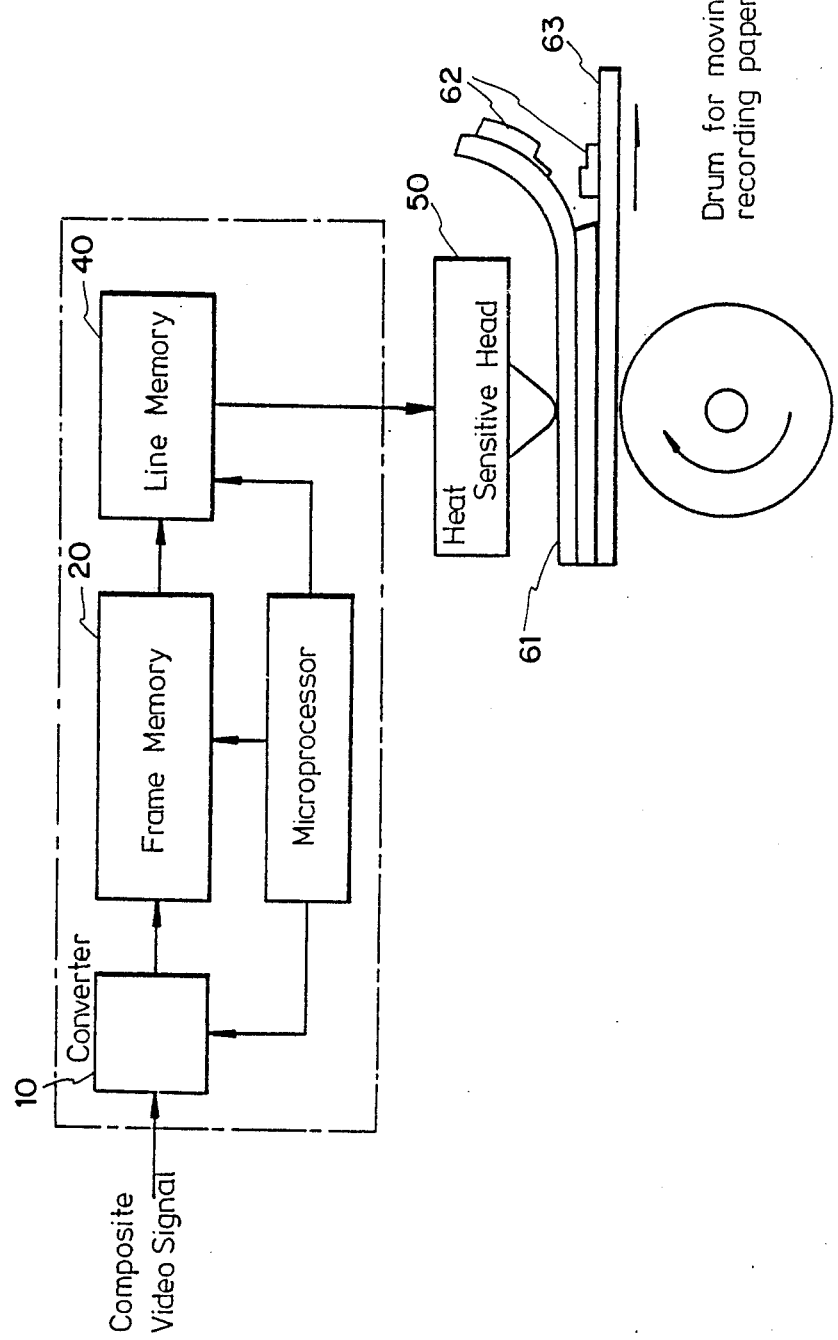

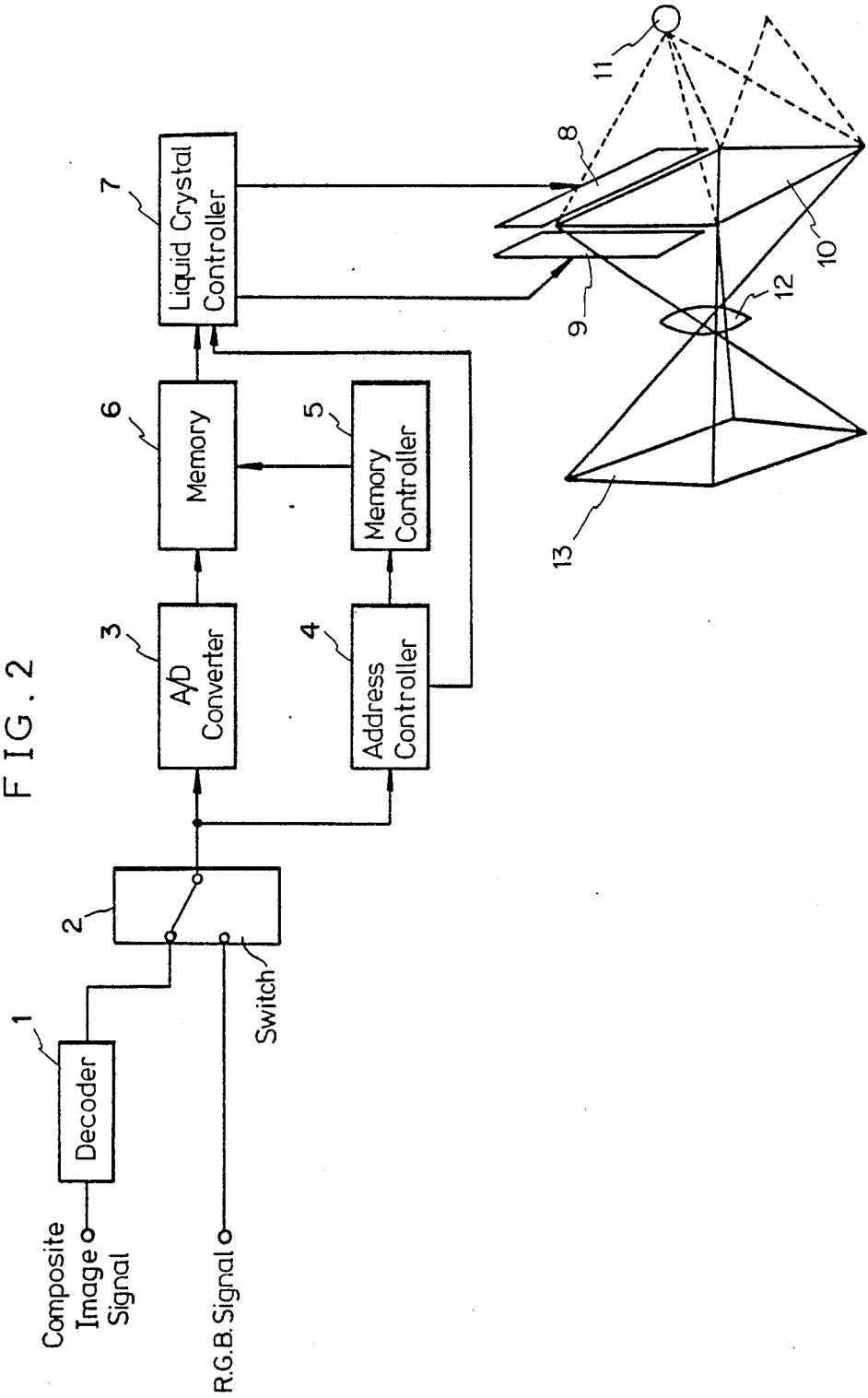

METHOD FOR PRINTING THE FRAME OF A COLOR TELEVISION BY USING THE LIQUID CRYSTAL FILTER

TECHNICAL BACKGROUND

This invention concerns a method for printing the frame of a color television.

Generally, the method for printing the frame of a color television comprises the steps of converting the composite video signal by an analog-digital converter (A/D converter), storing the converted signal in a memory, and printing the frame by printing means.

In printing the frame, the conventional printing method employs paper and an ink ribbon specially prepared, and a thermal printing head, resulting in the drawbacks that much time is consumed and the cost of printing is high.

As shown in FIG. 1, the conventional method for printing thermally the frame of a color television comprises the steps of converting the composite video signal by an A/D converter 10, storing a frame in the frame memory 20, transferring the frame signals sequentially to the line memory 40, and transferring the output of said line memory to a heat sensitive printing head 50 so that the ink of a heat sensitive ink ribbon 61 is thermally transferred to the paper 63 as indicated by the reference numeral 62'.

This conventional method has the drawbacks that the used ink ribbon has to be replaced and much time is required for printing because of printing the frame sequentially from one line to another. Moreover, the machine for printing the frame on the paper is complicated and difficult to manufacture, so that the cost becomes high and failure occurs frequently.

SUMMARY OF THE INVENTION

It is an object of the present invention to obviate the above drawbacks inherent in the conventional printing method.

It is another object of the present invention to provide a method for printing the frame of a color television whereby conventional instant printout paper can be used.

It is another object of the present invention to simplify the mechanism for printing the frame.

It is a further object of the present invention to provide a method for printing the frame of a color television by using a liquid crystal color filter.

According to the present invention, a method for printing the frame of a color television by using a liquid crystal color filter comprises the steps of applying a composite video signal to one input terminal of a switch through a decoder with the R. G. B. signal being applied to the other input terminal of said switch, converting the output of said switch by an A/D converter, storing the converted signal in a memory according to the address designated by a memory controller, said memory controller being controlled by the output of an address controller, said address controller being supplied with the output of said switch, applying the frame signal of said memory to the liquid crystal color filter through a liquid crystal controller to form a frame of complementary colors, projecting the light beams of a light source on said frame of complementary colors of said liquid crystal color filter for the original colors to reappear, and printing said frame on a printout paper.

BRIEF DESCRIPTION OF THE DRAWINGS

FIG. 1 is a block diagram illustrating the conventional method for printing thermally the frame of a color television.

FIG. 2 is a block diagram illustrating the method for printing the frame of a color television according to the present invention.

DETAILED DESCRIPTION OF A PREFERRED EMBODIMENT

The present invention will now be described more specifically with reference to the drawings attached, only by way of example.

As shown in FIG. 2, the composite video signal is applied to one input terminal of a switch 2 through a decoder 1 with the R. G. B. signals being applied to the other input terminal of the switch 2. The output of the switch 2 is converted to a digital signal by an A/D converter 3 and stored in the memory 6. When the signal of the frame of color television is stored in the memory 6 according to the address designated by a memory controller 5 depending on the output of an address controller 4, a liquid crystal controller 7 takes out the frame signal from the memory 6 according to the output controlling signal of the address controller 4 and applies it to the horizontal driver 8 and the vertical driver 9 of the liquid crystal color filter 10 to form a frame of complementary colors in the liquid crystal color filter 10.

The frame of complementary colors formed in the liquid crystal color filter 10 is transformed into the original colors by receiving the light beams of a light source 11 and printed on an instant printout paper 13. Thereafter, the image appears on the printout paper 12 so that the picture of the desired frame of a color television is obtained within a few seconds.

A lens 12 is used to reduce the frame, if the size of the liquid crystal color filter 10 is greater than that of the printout paper 13.

As described hereinbefore, the present invention provides a method for printing the frame of a color television by using the liquid crystal color filter which makes use of the conventional instant printout paper.

What is claimed is:

1. A method of printing a frame of a color television image, comprising the steps of: applying via a decoder a composite video signal to one input terminal of a switch, and an R. G. B. signal to another input terminal of the switch, to form an output signal; converting the output signal by an A/D converter into a digital signal; storing the digital signal in a memory as a frame signal, depending on an address designated by a memory controller which is controlled by an address controller supplied with the output signal of said switch; retrieving the frame signal from said memory by a liquid crystal controller depending on the output of said address controller and applying the frame signal to a liquid crystal color filter to form on said filter a frame of complementary colors; transforming the frame of complementary colors into an image with the original colors of said television frame by projecting light beams of a light source on said filter; and focussing the image via a lens onto instant printout paper.

* * * * *